United States Patent [19]

Vennard

[11] 4,228,389
[45] Oct. 14, 1980

[54] NON-REVERSIBLE CONSUMER REPLACEABLE WATCH BATTERY

[75] Inventor: John Vennard, Los Gatos, Calif.

[73] Assignee: National Semiconductor Corporation, Santa Clara, Calif.

[21] Appl. No.: 753,599

[22] Filed: Dec. 22, 1976

[51] Int. Cl.[3] .......................... H01M 2/00; G04C 3/00
[52] U.S. Cl. ...................................... 320/2; 368/282; 368/276; 368/88
[58] Field of Search .................. 320/2; 58/23 BA, 53, 58/91, 50 R; 429/162, 163, 164, 174

[56] References Cited

U.S. PATENT DOCUMENTS

| | | | |
|---|---|---|---|
| 2,974,474 | 3/1961 | Wegner | 58/50 R |
| 3,076,860 | 2/1963 | Dickfeldt et al. | 429/162 |
| 3,608,304 | 9/1971 | Schaad | 58/23 BA |
| 4,025,702 | 5/1977 | Nishimura et al. | 429/164 X |

FOREIGN PATENT DOCUMENTS 337148  4/1959  Switzerland .......................... 58/23 BA

*Primary Examiner*—Robert J. Hickey
*Attorney, Agent, or Firm*—Brown & Martin

[57] ABSTRACT

A non-reversible battery and mounting assembly for an electrically powered watch includes a battery having a casing defining a generally cylindrical configuration with an annular radially extending shoulder adjacent one end thereof for engaging an inwardly directed shoulder on a battery cavity of a component housing. The shoulder within the component housing being positioned such that the battery will fit within the cavity in only one orientation with a retaining ring engaging the flange on the battery case for retaining the battery within the housing. The back of the battery also serves as the back of the watch case eliminating the need for a separate back therefor. The retaining ring is provided with a hole for receiving the point of a ballpoint pen or similar object for use in removing the retainer ring.

6 Claims, 7 Drawing Figures

NON-REVERSIBLE CONSUMER REPLACEABLE WATCH BATTERY

BACKGROUND OF THE INVENTION

The present invention relates to batteries and pertains particularly to consumer replaceable non-reversible battery for electronic time pieces.

Electrically powered watches particularly of the digital type have become quite popular in recent years. Digital watches employ a miniaturized time keeping circuit powered by a battery for maintaining time and for providing suitable readout indicating means for indicating the time, date and other information. Such circuits are powered by miniature batteries which typically last up to approximately a year.

There are however a number of drawbacks to prior art construction of such batteries and the mounting thereof within the time piece casing. One such drawback if that such batteries are mounted within the casing such that special tools are required in order to replace the battery. Accordingly when the battery needs replacing, it is necessary to take the watch to a jeweler or the like for replacing the battery. Such a requirement is not only expensive but is a nuisance.

Another problem with such time pieces is that the batteries are such that they may be easily reversed within the mounting and thereby damage the electronic circuit within the watch. This is particularly so where the layman or consumer learn to remove the watch back and attempts to replace the batteries himself.

Still another problem with such prior art constructions is that the battery thickness must normally be accomodated in one or more bores within the watch module.

Accordingly it is desirable that a non-reversible battery be provided that is also quick and convenient to replace.

SUMMARY AND OBJECTS OF THE INVENTION

It is accordingly a primary object of the present invention to overcome the above problems of the prior art.

Another object of the present invention is to provide a battery and a mounting assembly therefor that prevents reversal of the battery.

A further object of the present invention is to provide a non-reversible battery and a mounting assembly therefor that permits quick and easy replacement of the battery.

In accordance with the primary aspects of the present invention, a replaceable battery for miniature electronic or electrically powered watches is constructed to have a retaining flange near one end thereof, and mounting means within the housing of the electronic device such that the battery will fit within the housing in one orientation only. Another aspect of the invention provides for shaping the battery to encompass a portion of the watch module. Still another aspect of the invention provides for the battery to serve as a portion of the watch case.

BRIEF DESCRIPTION OF THE DRAWING

The above and other objects and advantages of the present invention will become apparent from the following description when read in conjunction with the drawing wherein.

DETAILED DESCRIPTION OF A PREFERRED EMBODIMENT

Figure 1:
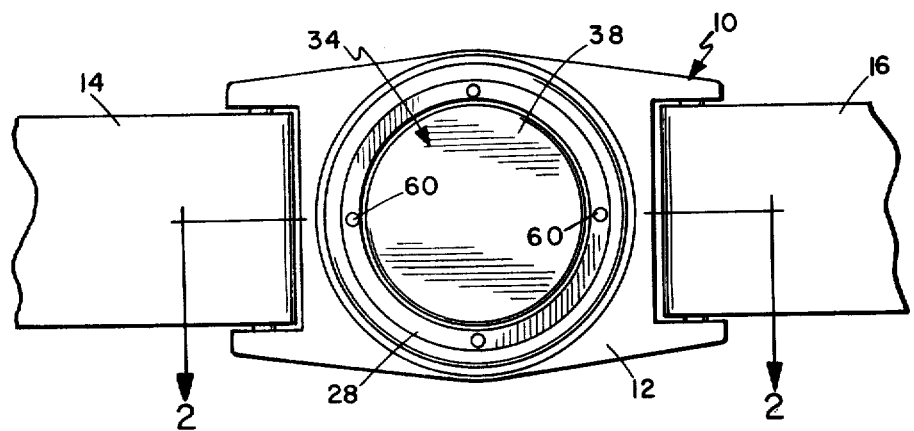
FIG. 1 is an underside view of a preferred embodiment of the present invention incorporated in a watch.

Turning now to the drawing, there is illustrated an electrically powered watch of the digital electronic type indicated generally by the numeral 10 having a case 12 in which the watch components are mounted and the usual wrist straps 14 and 16 for mounting upon the wrist of a person.

Figure 2:
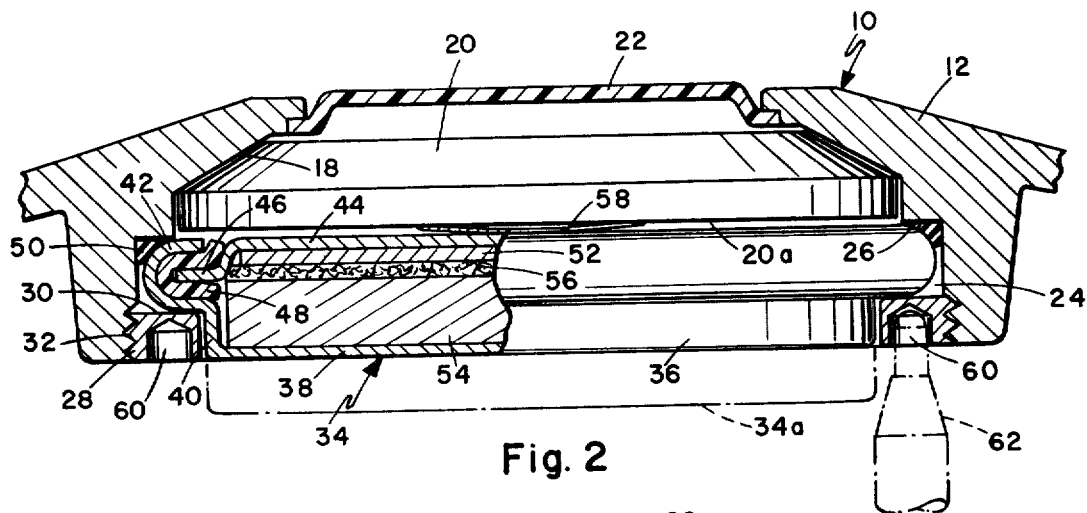
FIG. 2 is a sectional view taken generally along lines 2—2 of FIG. 1.

With particular reference to FIG. 2, the watch case 12 is constructed to have an inner chamber or cavity 18 in which is mounted a watch module 20. The watch module 20 contains the usual timing and display circuitry and includes a readout portion disposed beneath a window 22 for indicating the time and other information.

In accordance with one aspect of the invention, the watch case 12 is provided with a battery mounting assembly for mounting an enlarged miniature battery for powering the watch circuit. The battery is enlarged to substantially the full diameter of the watch itself to have a larger capacity than conventional watch powering batteries. The watch case 12 is provided with a bore 24 leading to cavity 18 and including means defining an annular inwardly directed shoulder 26 for abutment with a battery flange to be described. It will be noted that this shoulder 26 is dimensioned with respect to the cavity 18 to conform fairly closely to the face 20a of the module 20.

A battery retaining member in the form of a ring 28 threadably engages the bore 24 and defines annular shoulder means 30 for engaging a flange on the battery for retaining it in place. Complimentary threads 32 are provided in bore 24 in the case 12 and on the outer diameter of the ring 28 so that the ring 28 may be threadably engaged with the watch case. Other suitable fastening means may be substituted for the threads 32.

A battery, generally designated by the numeral 34, in accordance with the present invention has a generally cylindrical configuration with the length thereof along the cylindrical axis being considerably shorter than the diameter thereof. In the illustrated embodiment the diameter of the battery is preferably substantially as great as the diameter of the watch. The battery case comprises a generally cup shaped member 36 having a generally flat bottom 38 which serves as the back or closure of the watch itself.

A cylindrical side wall 40 extends upward from the bottom 38 and is crimped around in a 180° crimp defining a radial flange 42. The radial flange 42 is confined between the shoulder 26 of the watch case or housing and the shoulder 30 of the retaining ring 28. A closure portion of the battery case 36 comprises a generally disc shaped or plate shaped member 44 having a lip 46 extending outward beyond the diameter of the bottom 38 and around which the flange member or portion 42 is crimped with a seal 48 therebetween. A crush seal or O-ring 50 is positioned within or against the shoulder 26 against which radial flange 42 engages for sealing the watch housing.

The battery may have any form of anode, cathode and electrolyte therein. The construction for example includes an anode 52 which is in contct with the face or plate member 44 for defining the negative or anode portion or pole of the battery. A cathode portion or member 54 is in contact with the housing 36 and defines the positive portion or pole of the battery. A separator 56 separates the anode and cathode in the usual manner. A battery contact spring 58 is provided between the negative pole 44 and the watch module 20 for communicating electrical power thereto.

With this arrangement, a much larger battery than is conventionally available can be used for a watch thus giving a larger power capacity and a longer life to the operation of the watch. The radial dimensions of the watch give such great capacity. However, it will be noted as illustrated by broken line in FIG. 2, for example, that the back of battery may extend downward beyond the lower surface of the retaining ring 28 for defining the back of the watch housing. This gives a battery designated by the numeral 34a almost twice the size of that illustrated in solid lines in FIGS. 2 and 3.

Figure 3:
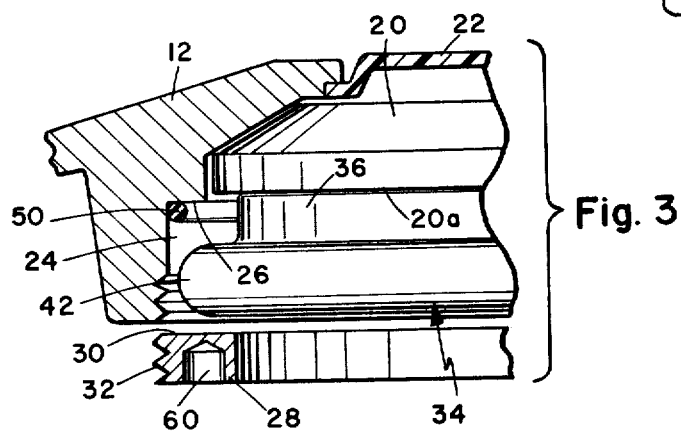
FIG. 3 is a partial sectional view showing the battery incorrectly inserted.

It will also be noted that the shoulder 42 is at one end of the battery 34. This end in the illustrated embodiment being that which is the innermost end of the battery for contacting with the watch module. It will also be noted that the battery has a length that is at least as long along its axis as the depth of the bore 24. Thus, if the battery is placed within the battery cavity in the reverse position the flange 42 will extend to a position which will prevent the attachment of the retaining ring 28 thereto. Thus, the battery cannot be placed in the watch in the reverse position as shown in FIG. 3. This therefore makes the watch and the mounting assembly thereof essentially non-reversible.

An additional feature of the watch comprises bores 60 in ring 28 for receiving a tool such as a point of a ballpoint pen 62 as illustrated in FIG. 2, for rotating the ring 28 and removing same from the casing 12. Thus with this arrangement, no special tools are needed for removing the back of the watch. The consumer merely obtains a battery for replacement of the one in the watch and utilizes a pointed instrument such as a ballpoint pen for removing the retaining ring 28. The construction of the battery and the battery mounting or receiving cavity is such that the battery cannot be placed therein in a reversed position. Thus the consumer may easily remove and replace the batteries within the watch.

Figure 4:
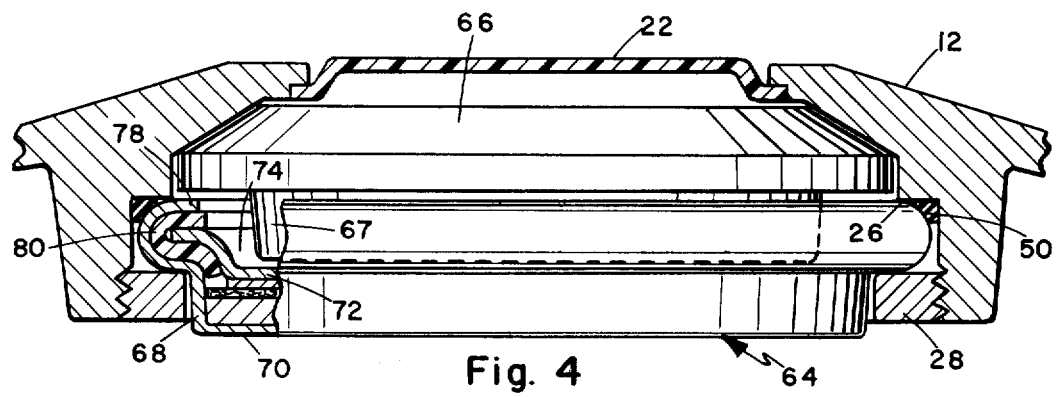
FIG. 4 is a sectional view similar to FIG. 2, but showing a dished battery.

Turning now to FIG. 4 of the drawings an alternate embodiment of the invention is illustrated wherein identical elements are identified by the same reference numerals as in the previous embodiment. As in the previous embodiment, the same watch case 12 may be utilized. An alternate embodiment of the battery designated generally by the numeral 64 is generally disc shaped in configuration, as illustrated in FIG. 4, including a cavity for receiving an extension 67 of a watch module 66. The thicker module 66, as illustrated, may be required for example where a liquid crystal diode (LCD) type of display is utilized. Such systems generally require greater space for packaging than the light emitting diode (LED) types of displays. Since they also normally require less battery power, a thinner or small capacity battery as illustrated will usually be suitable in capacity.

The battery comprises an outer can or cup shaped member 68 having a flat bottom 70 as in the previous embodiment defining the back of the watch. This can or cup shaped member is substantially the same configuration as that in the previous embodiment. The primary distinction over previous embodiment however, lies in the orientation of the disc or plate shaped member 72, being shaped and oriented to define a cavity 74 at the forward end of the battery. This cavity 74 receives an extension 67 of the module 66. The shape of the watch is thus seen to be such that an annular retaining flange 76 is defined by the crimping of the lip 78 of the can 68 about or over the edge of the disc 72 and seal 80 is effectively beyond the forward end or forward face of the battery. Thus the entire battery itself is generally cup shaped to accomodate an extension of the watch module itself or enclose or encompass a portion thereof.

Figure 5:
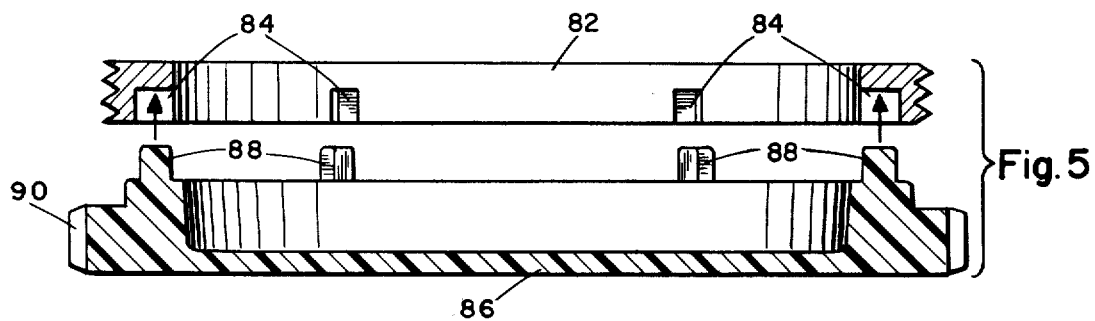
FIG. 5 is a diametrical sectional view of a battery retaining ring and associated spanner wrench for inserting and removing the ring.

Different forms of retaining means for retaining the watch within the case may be utilized as disclosed herein. Turning to FIG. 5 for example, an alternate embodiment of a retaining ring 82 is illustrated having, for example, a plurality of notches or cavities 84 for engagement by a suitable tool for removing the retaining ring. A suitable tool, for example, may be as illustrated at 86 having a generally circular configuration with a plurality of pins 88 extending from one side thereof for engaging the notches 84. The removal tool 86 is preferrably of a suitable disposable material such as plastic having a generally circular configuration with the pins 88 extending from one side thereof having a generally flat opposite side and a radially extending rim 90 having suitable means such as serration for facilitating a grip thereof.

Figure 6:
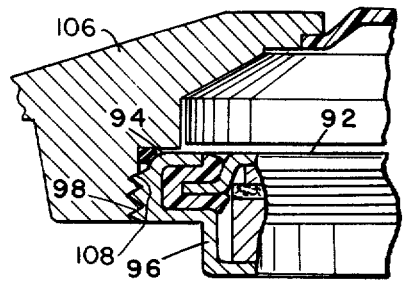
FIG. 6 is a partial sectional view of a battery with integral screw threads.

Turning to FIG. 6 there is illustrated an alternate embodiment of retaining means built directly into the battery. As illustrated, a battery 92 includes a radial flange 94 defined by the crimp of the cup portion 96 of the battery and including a threaded portion 98 defined thereon. In this arrangement the battery itself is simply thereaded into the bore of the watch. In this embodiment, a watch 106 is constructed much the same as in the previous embodiment, but with a bore 108 being shallower and threaded to the bottom thereof. As in the previous embodiment, the batery has a length in relation to the battery receiving bore or cavity such that the battery and its retaining ring cannot be accomodated in the cavity in the reverse position. If the battery is reversed, the thread 98 of the retaining ring will not engage the threads of the housing bore.

Figure 7:
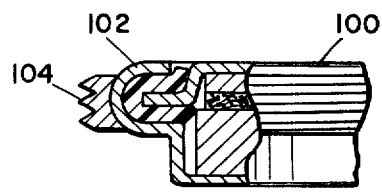
FIG. 7 is a further partial sectional view of a battery with a threaded ring attached.

Turning now to FIG. 7, a still further embodiment or modification of the battery is shown wherein, a battery 100 includes a flange 102 on which is secured in a suitable manner an annular threaded ring 104. The ring 104 is suitably secured to the flange 102 and threadably engages the threads within the bore 108 of the watch case 106. Suitable tool engaging slots not shown may also be formed in a portion of the battery as illustrated with regards to the previously illustrated retaining rings.

While the present invention has been described by means of specific embodiments, it is to be understood that numerous changes and modifications may be made therein without departing from the spirit and scope of the invention as defined in the appended claims.

Having described my invention, I now claim:

1. A non-reversible battery and mounting assembly for electrically powered time pieces and the like comprising in combination:

a battery having a casing defining a generally cylindrical configuration and an annular radially extending shoulder adjacent one end defining the forward end thereof, wherein said battery is formed of a generally cup shaped member having a flat bottom thereof defining the back of said watch case, and includes a closure member of a substantially disc shape and said cup shaped member includes side walls crimped over the edge of said disc shaped member for sealing said battery, and said crimped portion of said cup member defines said shouler on said battery, a component housing having means defining a generally cylindrical battery receiving cavity having an inwardly extending annular shoulder fixed therein for abuttment with said shoulder on said battery, battery retaining means removably mountable within said cavity and having means for cooperatively engaging the walls of said cavity and for engaging and biasing said shoulder on said battery into said cavity for retaining same against said inwardly extending shoulder within said cavity, the length of said battery being at least equal to the length of said cavity, and the length of said battery and said shoulder on said battery in relation to the length of said cavity being such that said battery retaining means can engage the walls of said cavity only with said forward end of said battery extending into said cavity.

2. The battery assembly as defined in claim 1 wherein said cylindrical battery receiving cavity is defined by a generally cylindrical bore extending into said component housing, and said battery retaining means comprises an annular ring threadably engaging said bore.

3. The battery assembly of claim 1 wherein said crimp extends 180° over the edge of said disc shaped member.

4. The battery assembly of claim 1 wherein the length of said battery exceeds the depth of said bore.

5. A non-reversible battery and mounting assembly for electrically powered time pieces and the like comprising in combination:

a battery having a casing defining a generally cylindrical configuration and an annular radially extending shoulder adjacent one end defining the forward end thereof, said battery includes a closure member of substantially dish shape oriented to define a cavity at the forward end of said battery and a cup shaped member having side walls crimped over the edge of said dish shaped member for sealing said battery and defining said shoulder, a component housing having means defining a generally cylindrical battery receiving cavity having an inwardly extending annular shoulder for abuttment with said shoulder on said battery, battery retaining means removably mountable within said cavity and having means for cooperatively engaging the walls of said cavity for biasing said shoulder on said battery into said cavity for retaining same against said inwardly extending shoulder within said cavity, the length of said battery in relation to the length of said cavity being such that said battery retaining means can engage the walls of said cavity only with said forward end of said battery extending into said cavity, said retaining means comprises threads formed on said shoulder for threadably engaging the cylindrical walls of said cavity.

6. A non-reversible battery and mounting assembly for electrically powered time pieces and the like comprising in combination:

a battery having a casing defining a generally cylindrical configuration and an annular radially extending shoulder adjacent one end defining the forward end thereof, a component housing having means defining a generally cylindrical battery receiving cavity having an inwardly extending annular shoulder for abuttment with said shoulder on said battery, and said cylindrical battery receiving cavity is defined by a generally cylindrical bore extending into said component housing, battery retaining means removably mountable within said cavity and having means for cooperatively engaging the walls of said cavity for biasing said shoulder on said battery into said cavity for retaining same against said inwardly extending shoulder within said cavity, the length of said battery in relation to the length of said cavity being such that said battery retaining means can engage the walls of said cavity only with said forward end of said battery extending into said cavity, said battery retaining means comprises threads on said annular shoulder threadably engaging said bore.

* * * * *